United States Patent [19]
Wakabayashi

[11] Patent Number: 5,127,336
[45] Date of Patent: Jul. 7, 1992

[54] ELECTRICALLY DRIVEN SELF-PROPELLED TRUCK AND APPARATUS FOR CHANGING COURSE THEREOF

[75] Inventor: Takao Wakabayashi, Osaka, Japan

[73] Assignee: Nakanishi Metal Works Co., Ltd., Osaka, Japan

[21] Appl. No.: 629,917

[22] Filed: Dec. 19, 1990

Related U.S. Application Data

[60] Division of Ser. No. 579,227, Sep. 6, 1990, Pat. No. 5,013,203, which is a continuation of Ser. No. 341,998, Apr. 20, 1989, abandoned.

[30] Foreign Application Priority Data

Apr. 20, 1988 [JP] Japan ................................. 63-98848
Apr. 20, 1988 [JP] Japan ................................. 63-98849

[51] Int. Cl.⁵ .............................................. B61J 1/00
[52] U.S. Cl. ................................. 104/35; 104/99; 104/243; 104/245; 198/465.1; 414/223
[58] Field of Search ................. 104/35, 45, 48, 96, 104/99, 243, 245, 246, 247; 198/465.1; 414/223

[56] References Cited

U.S. PATENT DOCUMENTS 4,041,873  8/1977  Jones ..................................... 104/35

FOREIGN PATENT DOCUMENTS 262295   2/1960   Australia ............................. 104/35
3900616  7/1989   Fed. Rep. of Germany ........ 104/96
2018695  10/1979  United Kingdom .................. 104/35

*Primary Examiner*—Douglas C. Butler
*Assistant Examiner*—Kevin D. Rutherford
*Attorney, Agent, or Firm*—Armstrong & Kubovcik

[57] ABSTRACT

An electrically driven self-propelled truck having at least one electrically driven wheel guidable along a rail on a floor, an article lift table mounted on the upper side of the truck body, a work space provided around the lift table, and an adjacent truck coupling provided at least one side edge portion of the truck body. At an intersection of truck guide rails on the floor, a rail segment rotating mechanism is provided which has a rail segment for changing the course of the wheel. A truck orientation changing turntable is provided on a floor portion where the orientation of the truck is to be changed.

3 Claims, 6 Drawing Sheets

FIG. I

ELECTRICALLY DRIVEN SELF-PROPELLED TRUCK AND APPARATUS FOR CHANGING COURSE THEREOF

This is a division of application Ser. No. 579,227 filed Sep. 6, 1990, now U.S. Pat. No. 5,013,203 which in turn is a continuation application of application Ser. No. 341,998, filed Apr. 20, 1989, now abandoned.

BACKGROUND OF THE INVENTION

The present invention relates to electrically driven self-propelled trucks and an apparatus for changing the course thereof for use, for example, in motor vehicle production lines or the like.

For example in production lines for motor vehicles or household electric appliances, various parts are attached to intermediate products or like articles as loaded on electrically driven self-propelled trucks.

However, the article to be transported is placed in a fixed position on the conventional truck, so that the part to be provided on a lower portion of the article must be attached by the worker in a lowered posture, hence extreme difficulty. Further since parts are usually attached to the article by the person working on the floor around the truck, the article is not readily accessible. This results in the problem of a low work efficiency.

Further at a location where the course of the self-propelled truck is to be changed, a gradually curved guide rail is conventionally installed to change the direction of the guide rail itself, and the truck is driven along the curved rail for the change of its course. This entails the problem that the factory requires a wide space for the installation of the guide rail.

Further to assure convenient part attaching work, there arises a need to change the orientation of the truck itself, therefore the orientation of the article as placed on the truck without changing the direction of advance of the truck. To meet the need, the truck itself is provided with means for changing the orientation of the truck in its entirety or for changing only the orientation of the article on the truck. Nevertheless, this leads to the problem that the truck becomes complex in construction and costly to make, consequently increasing the equipment cost of the conveyor system in the production line.

SUMMARY OF THE INVENTION

The main object of the present invention is to overcome the foregoing problems.

The present invention provides as a feature thereof an electrically driven self-propelled truck comprising a truck body having an electrically driven wheel, an article lift table mounted on the upper side of the truck body and liftable by drive means, the truck body having a work space at at least one side of the lift table, and an adjacent truck coupling provided at at least one side edge portion of the truck body.

When the article lift table is raised or lowered by the drive means, the article to be transported on the truck can be held at a desired level suited to work, with the result that the parts to be provided on a lower portion of the article can be attached thereto very efficiently by the worker on the truck. This serves to speed up the production line, for example, for motor vehicles to achieve improved productivity.

Further one truck is connectable by the coupling to another truck adjacent thereto at one side or in front or rear thereof, with their opposed side edge portions butting against each other, so that the article on the adjacent truck is very readily accessible. This achieves an improved work efficiency, rendering the production line speedier and more efficient. Since there is no clearance between the adjacent trucks, the worker can transfer from one truck to the other truck without any hazard and is able to perform his work on the trucks as if he were on the usual floor, hence very high safety.

The invention provides as another feature thereof an apparatus for changing the course of an electrically driven self-propelled truck, the truck having an electrically driven wheel attached to the lower side of the body of the truck and freely rotatable in a horizontal plane, the apparatus comprising at least two truck guide rails arranged in different directions and intersecting each other, and a rail segment rotating mechanism installed on a floor at the intersection and having a rail segment for changing the course of the wheel, whereby when the wheel of the truck traveling along one of the guide rails with the rail segment positioned as connected thereto is stopped on the rail segment rotating mechanism, the rotating mechanism operates to rotate the wheel through a required angle along with the rail segment in the horizontal plane and to thereby position the rail segment as connected to the other guide rail.

The course changing apparatus of the invention is adapted to change the course of the truck reliably, for example, through a right angle in a very small space. When incorporating the present apparatus, therefore, the conveyor line can be installed in a greatly reduced space within the factory.

The present invention provides as another feature thereof an apparatus for changing the course of an electrically driven self-propelled truck, the truck having an electrically driven wheel attached to the lower side of the body of the truck and freely rotatable in a horizontal plane, the apparatus comprising a truck orientation changing turntable provided on a floor portion where the orientation of the truck is to be changed, a truck advance guide rail having one end positioned on the turntable, a truck delivery guide rail spaced from the advance guide rail by a specified distance and having one end positioned on the turntable, and a rail segment rotating mechanism provided on the turntable and having a rail segment for changing the course of the wheel, whereby when the truck traveling along the advance guide rail with the rail segment positioned as connected thereto is stopped on the turntable with its wheel stopped on the rail segment rotating mechanism, the turntable is rotated through a required angle and the rotating mechanism operates to rotate the wheel through a required angle in the horizontal plane along with the rail segment and to thereby position the rail segment as connected to the delivery guide rail.

With use of the course changing apparatus of the present invention, the orientation of the self-propelled truck can be changed reliably with the direction of advance of the truck unchanged, hence a great convenience. Since the truck is simple in construction and low in production cost, conveyor systems can be installed at the lowest possible equipment cost.

The present invention will be described in greater detail with reference to the accompanying drawings.

The drawings show the present invention as embodied for a motor vehicle production line.

DESCRIPTION OF THE PREFERRED EMBODIMENT

Figure 1:
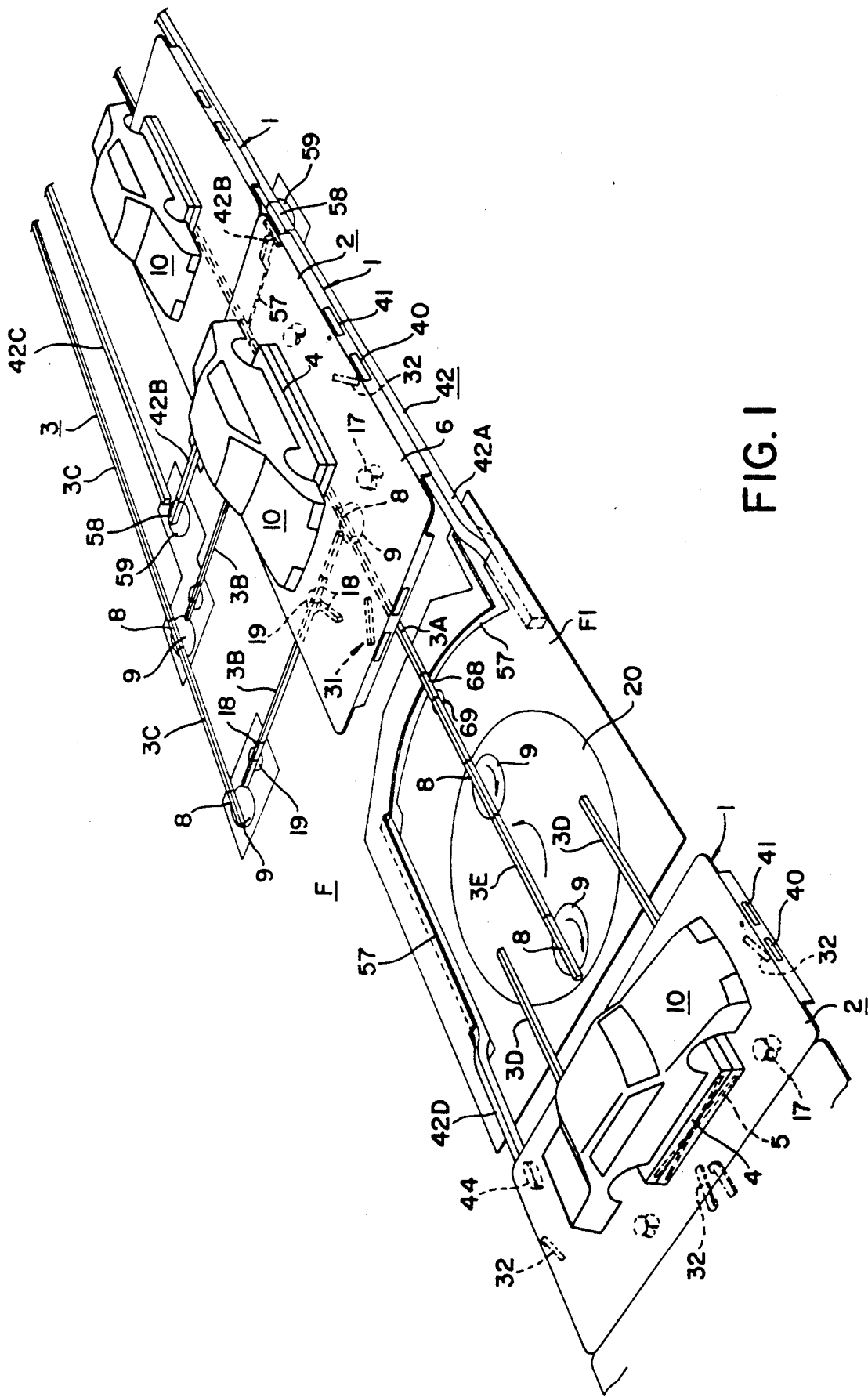
FIG. 1 is a schematic perspective view showing electrically driven self-propelled trucks in use for illustrative purposes.

The term "front" as used herein refers to the direction of advance of the truck, and the terms "right" and "left" are used as the truck is viewed toward the front.

With reference to FIGS. 1 to 5, a guide rail 3 is laid on a floor F with a liner 7 provided therebetween. An electrically driven self-propelled truck 1 adapted to travel along the rail 3 comprises a truck body 2 generally rectangular when seen from above, and an article lift table 4 provided on the body 2 for placing thereon the article 10 to be transported, such as an intermediate product to be assembled into a motor vehicle. The table is liftable by drive means 5. A wide work space 6 is provided on the upper side of the body 1 around the lift table 4. Four adjacent truck couplings 31 are respectively provided at the front, rear, right and left side edge portions of the truck body 2.

Front and rear rotary plates 12, 12 are rotatably attached to the lower side of the truck body 1 centrally of its width. Each rotary plate 12 has a pair of opposed axle brackets 13, 13 extending downward therefrom. An electrically driven wheel 11 is supported by the brackets 13, 13 on the rotary plate 12 and is rollable on the liner 7. Thus, the truck 1 has a pair of front and rear wheels 11. A drive assembly 14 coaxial with the wheel 11 is attached to the left side of the left bracket 13 on each rotary plate 12. The drive assembly 14 includes a universal motor, reduction gear and brake. A roller support bracket 15, L-shaped when seen from the front, is attached to the right side of the right bracket 13 on the rotary plate 12. Rotatably mounted on the underside of the horizontal portion of the bracket 15 are front and rear pairs of horizontal deviation preventing rollers 16 which are in contact with opposite sides of the guide rail 3. Four casters 17 swivellable in a horizontal plane are attached to the lower side of the truck body 1 and positioned on opposite sides of the front and rear wheels 11. These casters 17 are rollable on the floor F.

Figure 3:
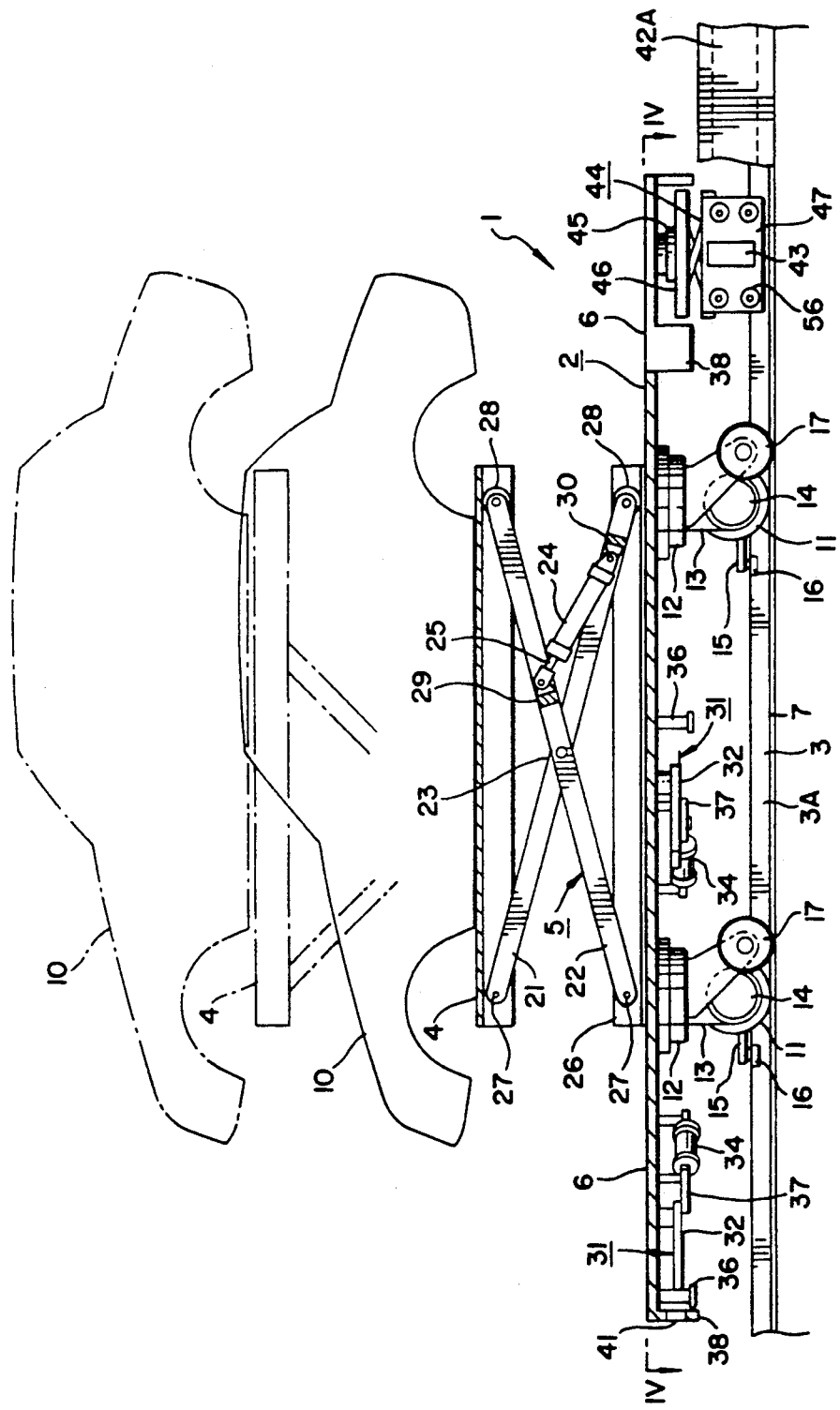
FIG. 3 is an enlarged left side elevation partly broken away and showing the truck.
Figure 4:
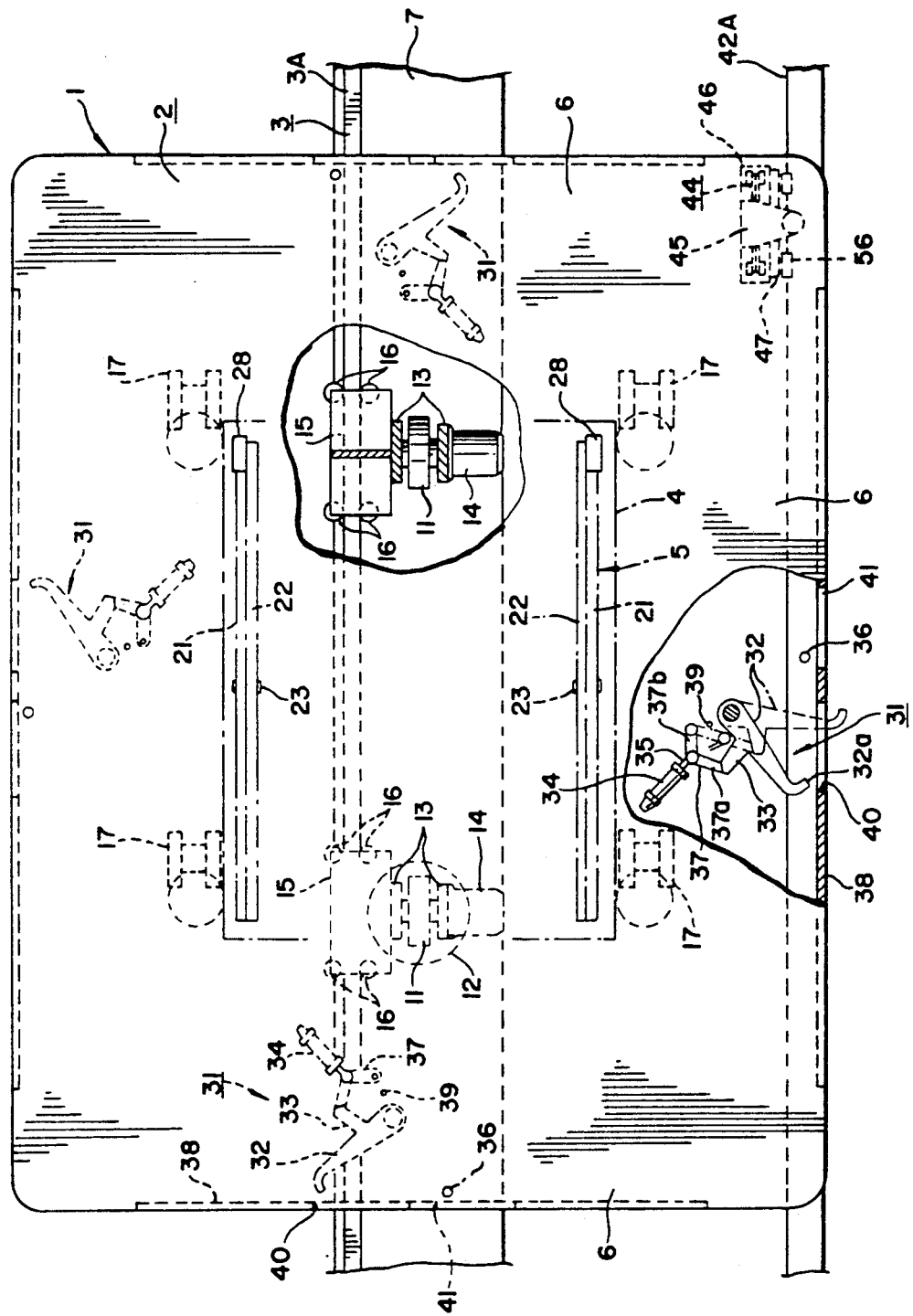
FIG. 4 is an enlarged plan view in section taken along the line IV—IV in FIG. 3 and partly broken away.
Figure 5:
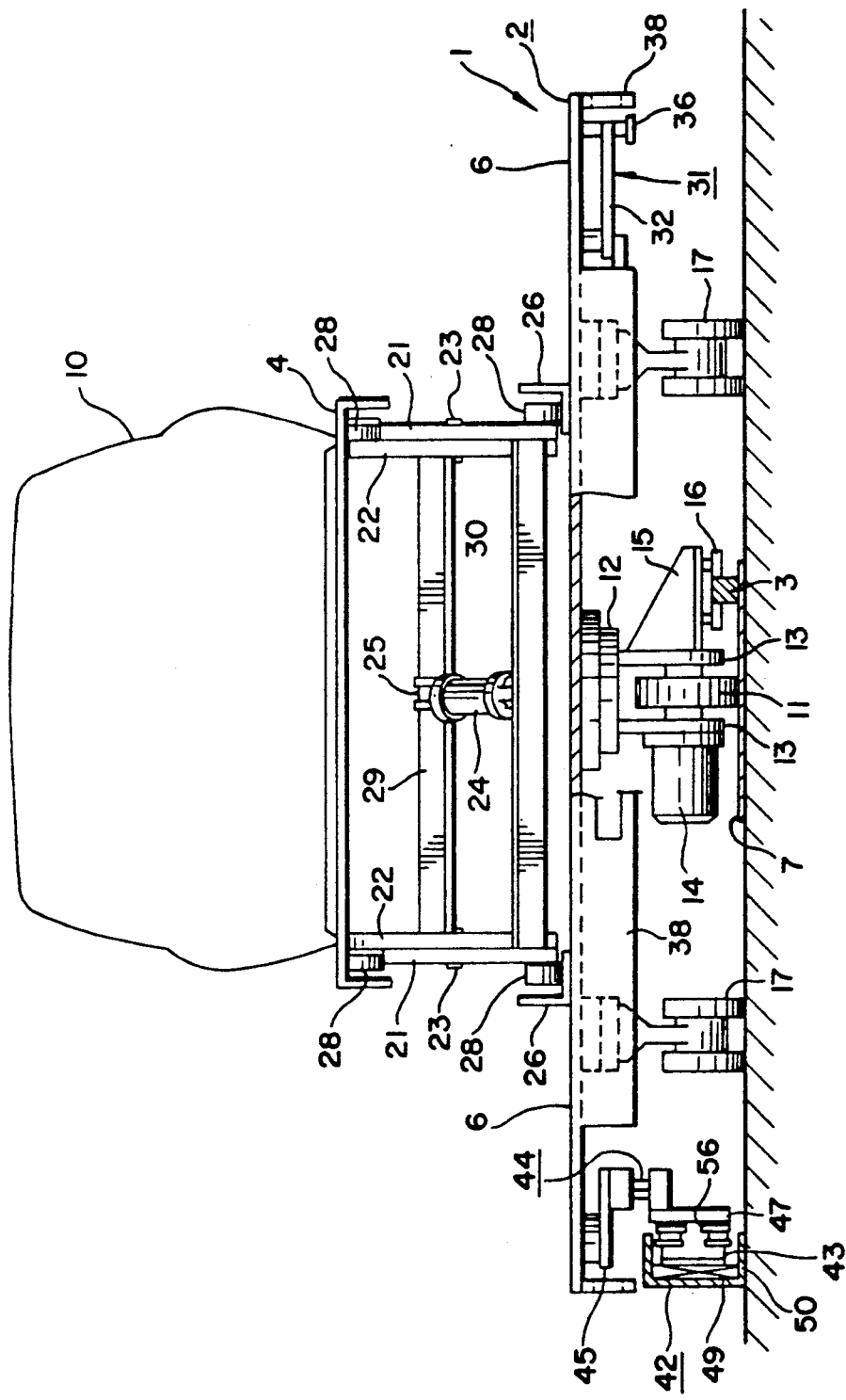
FIG. 5 is a rear view of the truck.

With reference to FIGS. 3 to 5, the drive means provided on the truck body 1 for the lift table 4 comprises collapsible first and second links 21, 22 connected together crosswise by a pin 23 at their mid-portions and provided on each side of the table 4, and a hydraulic cylinder 24 for unfolding or collapsing the links 21, 22. At each side of the lift table 4, the first and second links 21, 22 are pivoted at their front ends to a side portion of the table 4 and a horizontal portion of a guide rail 26, respectively, by pins 27, 27. The guide rail 26 is generally L-shaped in cross section. The two links 21, 22 carry at their respective rear ends rollers 28, 28 which are rollably in contact with the under face of the side edge portion of the table 4 and the upper face of the horizontal portion of the guide rail 26.

A lower horizontal connecting rod 30 is connected between the first links 21, 21 on opposite sides of the table 4. The rear end of the hydraulic cylinder 24 is pivoted to the midportion of the rod 30. An upper horizontal connecting rod 29 is connected between the second links 22, 22 which are positioned inwardly of the first links 21, 21. The outer end of the piston rod 25 of the cylinder 24 is pinned to the midportion of the upper rod 29. Accordingly, the cylinder piston rod 25, when advanced or retracted, unfolds or collapses the first and second links 21, 22 on opposite sides as moved about the connecting pins 23, whereby the table 4 is raised or lowered.

The adjacent truck couplings 31 are provided at the front, rear, right and left side edge portions of the truck body 2. Each of these couplings 31 comprises a hook 32 horizontally movably pivoted to the underside of the side edge portion of the body 2 and having a hooked forward end 32a, a hydraulic cylinder 34 for operating the hook 32 through a link assembly 37, and a pin 36 engageable by the hooked end 32a of the hook 32 on another truck 1 adjacent to the truck described.

The hook 32 has an arm 33 projecting from a portion thereof closer to its pivoted portion in a direction opposite to the hooked end 32a. The link assembly 37 comprises a pair of short links 37a, 37b interconnected by a pin. One end of the link assembly 37 is connected to the forward end of the arm 33 by a pin, and the other end of the assembly 37 is pivoted to the underside of the body side edge portion. The hook operating hydraulic cylinder 34 has a piston rod 35 movably attached to the pin interconnecting the two links 37a, 37b. At a position close to the pivoted portion of the hook 32, a stopper 39 engageable with the link assembly 37 extends downward from the truck body 2. The hydraulic cylinder 34 is pivoted at its base end to the underside of the truck body side edge portion.

When the hydraulic cylinder piston rod 35 is advanced, the two links 37a, 37b of the link assembly 37 are brought into alignment with each other and further brought to an outwardly projecting form as indicated in a dot-and-dash line in FIG. 4, whereupon the two links are held in this form by engaging means (not shown) provided at the respective pivoted portions of the links. Consequently, the link assembly 37 causes the arm 33 to pivotally move the hook 32 in a horizontal plane, engaging the hooked end 32a with the pin 36 on the adjacent truck 1. In this state, the link assembly 37 bears against the stopper 39 with the two links 37a, 37b held in the outwardly projecting form, so that even when the hook 32 is subjected to an external force acting to retract the hook, the two links 37a, 37b prop the hook 32 to prevent the hook from returning. Accordingly, even if the hydraulic cylinder 34 is brought out of operation after the adjacent two trucks 1, 1 are interconnected by its operation, the trucks 1, 1 can be held connected together. This assures extremely high safety.

A wall 38 extends downward from each of the four side edges of the truck body 2 and is formed in the midportion of its length with an opening 40 for the hooked end 32a of the hook 32 to pass therethrough, and with an opening 41 for the hooked end 32 of the hook 32 on the adjacent truck 1 to be inserted therethrough into engagement with the pin 36. These openings are arranged side by side.

For example, two trucks 1 positioned adjacent to each other longitudinally of the guide rail 3 can be interconnected by advancing the piston rods 35, 35 of the hydraulic cylinders 34, 34 of the couplings 31, 31 on the respective trucks 1, with the rear end of the preceding truck 1 in contact with the front end of the following truck 1. The piston rods 35, 35 then pivotally move the hooks 32, 32 in a horizontal plane as stated above, causing the hooked end 32a of each truck to engage with the engageable pin 36 on the other truck 1, whereby the two trucks are connected together tightly.

Although the two adjacent trucks 1, 1 are connected together by operating the respective couplings 31, 31 according to the illustrated embodiment, this mode of connection is not limitative. For example, when the following truck 1 overtakes the preceding truck 1 on the guide rail 3, the hook 32 of the coupling 31 of the following truck 1 only may be pivotally moved to connect the two trucks 1, 1.

Figure 2:
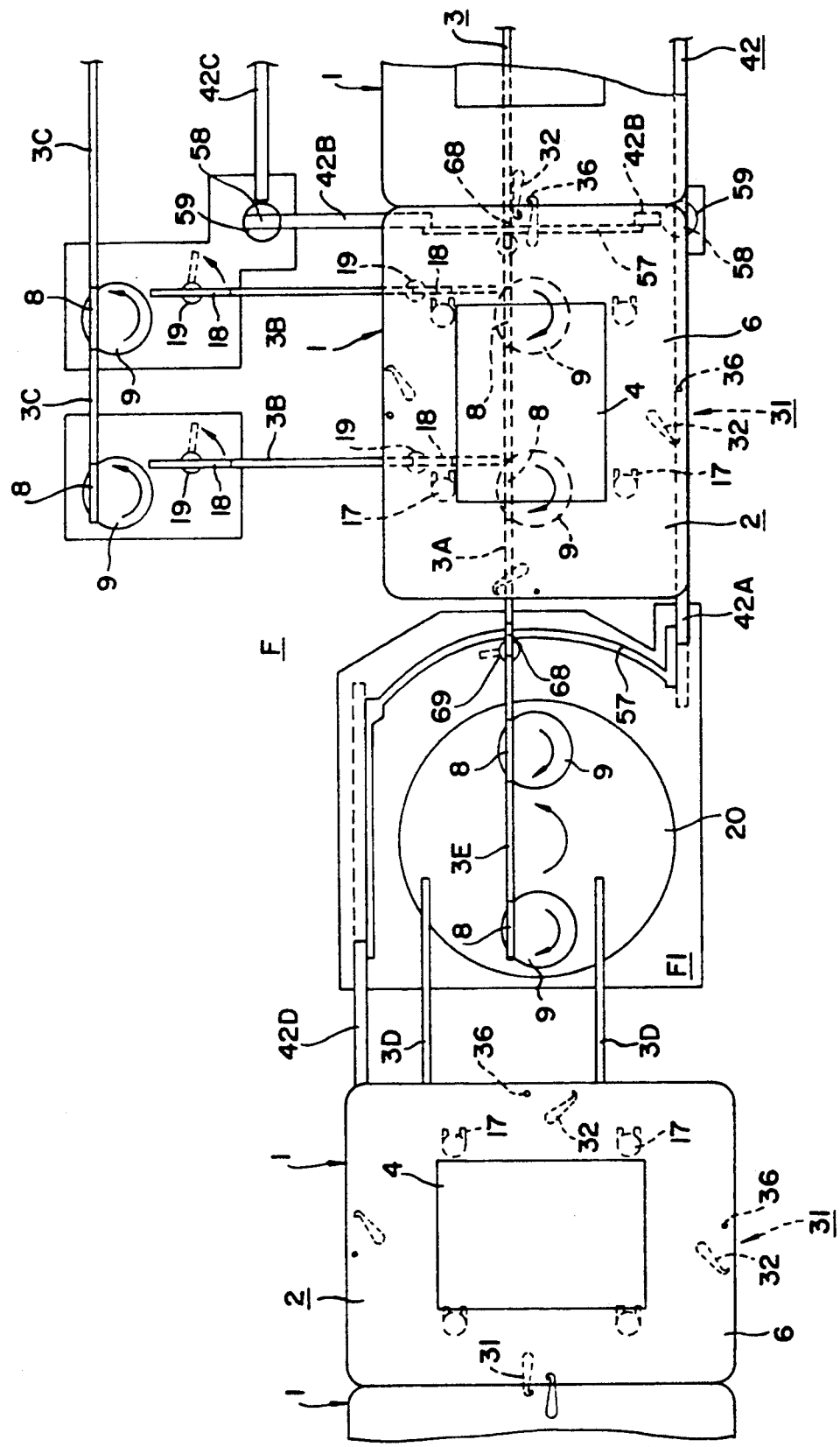
FIG. 2 is a plan view schematically showing the same with the article to be transported omitted.

FIGS. 1 and 2 show two types of apparatus for changing the course of electrically driven self-propelled trucks according to the present invention.

More specifically, a course changing apparatus of the first type is included in the rear half, with respect to the direction of advance of the truck, of the arrangement shown in these drawings. The front half of the illustrated engagement is a course changing apparatus of the second type which comprises a turntable for changing the orientation of the truck itself with the direction of advance of the truck unchanged.

With the apparatus of the first type, truck guide rails 3 include a forward guide rail 3A for advancing the truck 1 as oriented longitudinally of the rail 3A, a return guide rail 3C extending in parallel to the rail 3A for retracting the truck in the same orientation, and two connecting guide rails 3B, 3B interconnecting the two rails 3A and 3C.

A rail segment rotating mechanism 9 having a rail segment 8 for changing the course of the wheel 11 is provided on the floor at an intersection of at least two truck guide rails 3 arranged in different directions.

More specifically, at each of two intersections of the forward guide rail 3A with the two connecting guide rails 3B, 3B, and two intersections of the return guide rail 3C with the two guide rails 3B, 3B, the rail segment rotating mechanism 9 having the rail segment 8 is provided on the floor F.

The apparatus of the first type is so adapted that when the pair of front and rear wheels 11, 11 of the truck 1 traveling, for example, along the forward guide rail 3A with the two rail segments 8, 8 positioned as connected thereto are stopped on the respective rail segment rotating mechanisms 9, 9, the mechanisms 9, 9 operate to rotate the respective wheels 11, 11 through an angle of 90 degrees along with the rail segments 8, 8 in a horizontal plane and to thereby position the rail segments 8, 8 as connected to the connecting guide rails 3B, 3B.

Accordingly, the wheels 11, 11, when thereafter driven, travel the truck 1 along the connecting guide rails 3B, 3B perpendicular to the forward guide rail 3A.

Further when the truck 1 is transferred from the two connecting guide rails 3B, 3B to the return guide rail 3C as turned through a right angle, the two rail segment rotating mechanisms 9, 9 each having the wheel course changing rail segment 8 operate to change the course of the wheels 11 in the same manner as above.

It is noted that the truck 1 is provided with four freely rotatable casters 17 as already described. These casters 17 are provided on opposite sides of the guide rail 3. The guide rails 3 are arranged vertically or horizontally on the floor F. Accordingly, when the truck 1 advances without changing its course or when traveling sideways, some of the four casters 17 need to move across at least one of the rails 3.

With the present embodiment, a noncontinuous rail portion is formed in each of the connecting guide rails 3B, 3B at the portion thereof where the caster 17 is to move across the rail, and a caster passing rail segment 18 is fitted in the noncontinuous portion. The rail segment 18 is attached to a rotary plate 19. When the caster 17 strikes against the rail segment 18, the segment 18 pivotally moves in either direction, permitting the caster 17 to pass through the noncontinuous portion. Upon passage of the caster 17, the rail segment 18 returns to the original position under the action of a spring (not shown).

More specifically, the caster passing rail segment 18 as attached to the rotary plate 19 is provided at two portions of the front connecting guide rail 3B and also at two portions of the rear connecting guide rail 3B for the caster 17 to move across the respective connecting guide rails 3B when the truck advances or retracts.

With the present embodiment, each caster 17 is positioned close to the rear side of the wheel 11, so that when the truck 1 travels, for example, from the forward guide rail 3A toward the connecting guide rails 3B, 3B with its course changed through a right angle, the pair of front and rear casters 17, 17 on the left side of the truck 1 are adapted to pass through the respective noncontinueous portions of the forward guide rail 3A where the rail segments 8, 8 are directed transverse to the rail 3A to permit the change in the course of the wheels 11. Further when the truck 1 transfers from the guide rails 3B, 3B to the return guide rail 3C, the pair of front and rear casters 17, 17 on the right side of the caster 1 are adapted to pass through the respective noncontinuous portions of the return guide rail 3C where the rail segments 8, 8 are directed transversely of the rail 3C.

If each caster 17 is not positioned close to the rear side of the wheel 11 but is away therefrom, the rotary plate 19 having the caster passing rail segment 18 is provided at required portions of the forward and return guide rails 3A and 3C.

Power supply rails 42 are installed on the floor F at a specified distance from the truck guide rail 3. Provided at the left side of the rear end of the truck body 2 is a pantograph 44 having a current collector 43 which is movable along the power supply rails 42.

Like the truck guide rails 3, the power supply rails 42 include a forward power supply rail 42A, a return power supply rail 42C, and a connecting power supply rail 42B interconnecting the two rails 42A and 42C. The intermediate portion of the connecting power supply rail 42B is installed under the floor F at a lower level than the forward guide rail 3A so as not to interfere with the wheels 11 and the casters 17 of the truck 1.

A rail segment rotating mechanism 59 having a rail segment 58 for changing the course of the pantograph 44 is provided on the floor F at an intersection of at least two current supply rails 42 arranged in different directions.

More specifically, at each of the intersection of the forward power supply rail 42A with the connecting power supply rail 42B and the intersection of the rail 42B with the return power supply rail 42C, the rail segment rotating mechanism 59 having the rail segment 58 is provided on the floor F.

For example, when the truck 1 traveling along the forward power supply rail 42A is to be changed in its course through a right angle, the pantograph on the truck 1 is stopped on the rail segment rotating mechanism 59, whereupon the mechanism 59 operates to rotate the pantograph 44 through an angle of 90 degrees in a horizontal plane along with the rail segment 58, whereby the rail segment 58 is positioned as connected to the connecting power supply rail 42B.

Accordingly, the wheels 11, 11, when thereafter driven, cause the pantograph 44 on the truck 1 to move along the connecting guide rail 42B.

Further when the truck 1 traveling along the connecting power supply rail 42B is to be changed in its course to travel along the return power supply rail 42C, the rail segment rotating mechanism 58 having the rail segment 58 and disposed at the intersection of the rail 42C with the rail 42B operates similarly to change the course of the pantograph 44.

The power supply rails 42 and the pantograph 44 will be described in detail later.

The course changing apparatus of the second type has a turntable 20 by which the orientation of the truck 1 itself is changed to cause the truck to advance as oriented sideways along the forward guide rail 3A without changing its course.

More specifically, at a floor portion F1 where the orientation of the truck 1 is to be changed and to which the forward truck guide rail 3A extends, the turntable 20 is provided for changing the orientation of the truck 1. The guide rail, i.e. the truck advance guide rail 3A, has one end positioned on the turntable 20, and two truck delivery guide rails 3D, 3D spaced from the advance guide rail 3A by a specified distance each have one end thereof positioned on the turntable.

The turntable 20 is provided with a truck guide rail extension 3E. A pair of rail segment rotating mechanisms 9 each having a wheel course changing rail segment 8 are disposed at the respective ends of the extension 3E.

With the guide rail extension 3E and the two rail segments 8 at its opposite ends aligned with the advance guide rail 3A for connection thereto, the truck 1 traveling along the guide rail 3A as oriented longitudinally of the rail 3A is stopped on the turntable 20, with the pair of wheels 11, 11 halted on the respective rotating mechanisms 9, 9. In this state, the turntable 20 is rotated through 90 degrees, and aside from this rotation, the rotating mechanisms 9, 9 operate to rotate the wheels 11, 11 along with the rail segments 8, 8 through 90 degrees in a horizontal plane, whereby the rail segments 8, 8 are so positioned as to be connected to the ends of respective truck delivery guide rails 3D, 3D.

Consequently, the wheels 11, 11, when thereafter driven, advance the truck along the delivery guide rails 3D, 3D without any change in the direction of advance but as oriented transversely of the rails 3A, 3D.

At one side of the floor portion F1 where the orientation of the truck 1 is to be changed, the power supply rail 42 is installed under the floor portion, which is further formed with a slit 57 for the pantograph 44 to move therethrough. The guide rail 3 is formed, at the portion thereof intersecting the slit 57, with a noncontinuous rail portion like those provided for passing the caster 17 therethrough. A pantograph passing rail segment 68 is fitted in the discontinuous rail portion. The rail segment 68 has its one end attached to a rotary plate 69, such that when the pantograph 44 strikes against the segment, the segment pivotally moves in one direction, permitting the pantograph 44 to pass through the noncontinuous rail portion. Upon passage of the pantograph 44, the rail segment 68 returns to its original position under the action of a spring (not shown).

Figure 6:
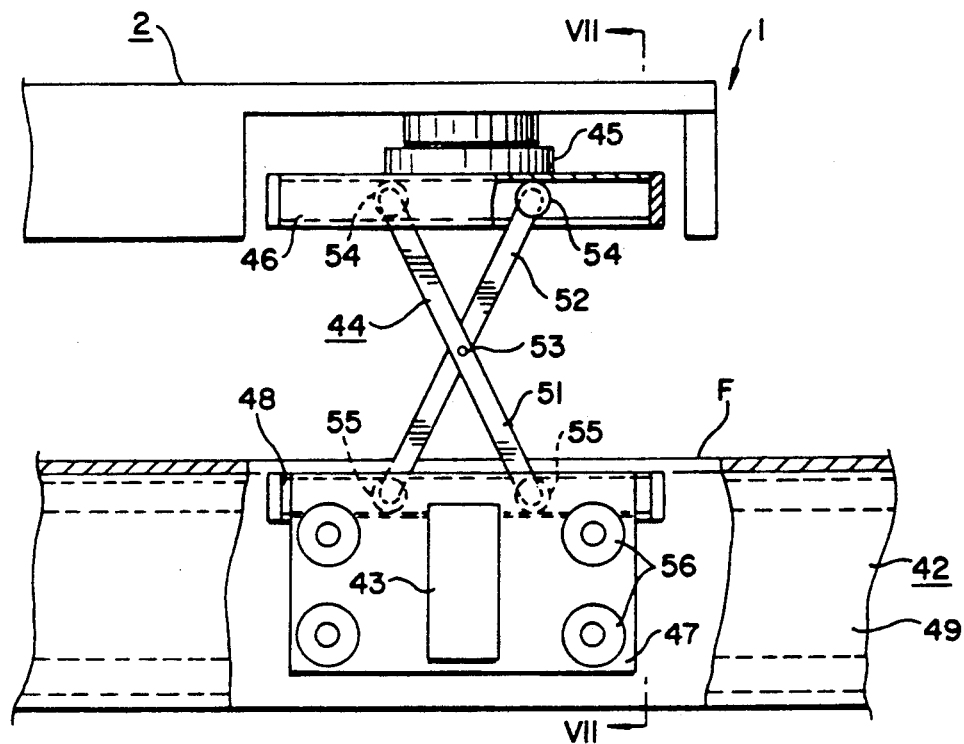
FIG. 6 is an enlarged fragmentary left side elevation partly broken away and showing in detail a current collector assembly of the truck and power supply means under the floor.
Figure 7:
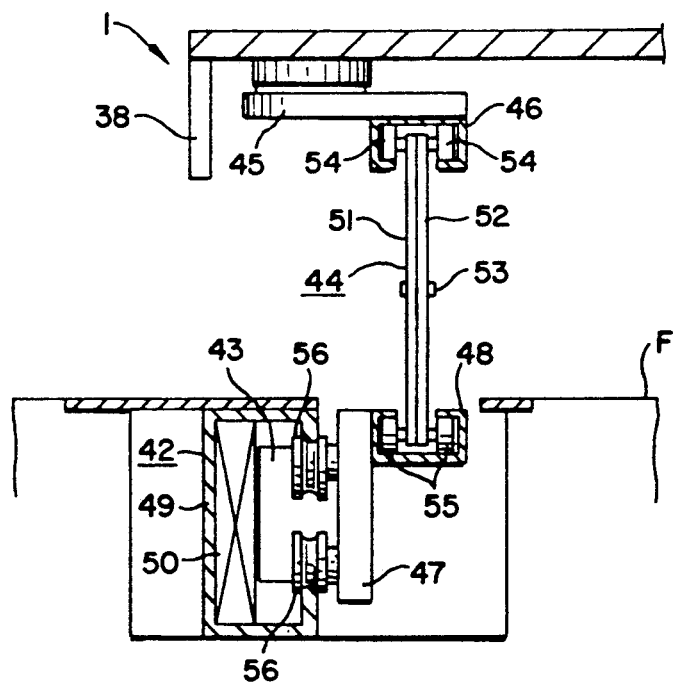
FIG. 7 is an enlarged fragmentary view in section taken along the line VII—VII in FIG. 6.

With reference to FIGS. 6 and 7, the power supply rail 42 is provided on the left side of the guide rail 3 on the floor F and is spaced from the rail 3 by a predetermined distance. As already stated, the pantograph 44 has the current collector 43 movable along the rail 42 and is disposed at the left side of the rear end of the truck body 2.

A rotary disk 45 is freely rotatably attached to the underside of the left-side rear-end portion of the body 2. Horizontally attached to one side of the rotary disk 45 is an upper roller holder 46 in the form of an elongated box which is close at its front and rear ends and open only at its bottom. A current collector body 47 in the form of a rectangular plate and movable along the power supply rail 42 has attached to the same side thereof as the disk 45 a lower roller holder 48 in the form of an elongated box which is closed at its front and rear ends and open only at its top. The lower holder 48 is horizontal and is opposed to the upper holder 46. The pantograph 44 comprises two links 51, 52 which are collapsibly connected together by a pin 53 in a crosswise arrangement. Each of the links 51, 52 carries at its upper end a pair of opposed rollers 54, 54 rollably retained in the upper holder 46. Similarly each of the links 51, 52 carries at its lower end a pair of opposed rollers 55, 55 which are rollably retained in the lower roller holder 48.

The current collector body 47 is provided, on the other side thereof facing the power supply rail 42, with the current collector 42 and front and rear pairs of upper and lower vertical rollers 56, 56 which are grooved. On the other hand, the power supply rail 42 comprises a rail body 49 generally C-shaped in cross section, and a power supply portion 50 provided inside the rail body and having power wires (not shown). With the current collector 43 accommodated in the rail body 49 and in contact with the power supply portion 50, the grooved vertical rollers 56, 56 are fitted to the upper and lower side edges of the rail body 49 defining an opening, whereby the current collector body 47 is made guidable by and held to the rail body 49.

To assure the power supply rail 42 of easy maintenance, the rail is usually installed on the upper side of the floor F as seen in FIGS. 1 to 5, whereas at locations where no obstacles should be present on the floor F, the power supply rail 42 is installed under the floor F as shown in FIGS. 1, 6 and 7. When the current collector 43 of the pantograph 44 is brought under the floor F by being guided along the rail 42, the links 51, 52 are unfolded vertically about the pin 53, thereby permitting the collector 43 to be held in contact with the power supply portion 50 at all times for the supply of power, following the power supply rail 42. The power supply portion 50 includes, for example, three electric wires (not shown), two of which are used for power supply, the remaining one being used for signal transmission. Further at the location where the power supply rail 42 is disposed under the floor F, the slit 57 is formed in the floor F in parallel to the rail 42 for the two links 51, 52 of the pantograph 44 to pass therethrough.

Electrically driven self-propelled trucks 1 having the foregoing construction including the lift table 4 are adapted to travel individually independently at a desired speed by the operation of the electrically driven wheels 11.

Although the truck 1 according to the illustrated embodiment has front and rear two wheels 11, the truck may have at least one wheel 11. In this case, the floor F where the course of the truck 1 is to be changed or the turntable 20 is provided with rotating mechanisms 9 having the rail segment 8 in a number in accordance with the number of wheels 11.

The drive means 5 for the article lift table 4 is in the form of a link mechanism which comprises a single hydraulic cylinder 24 and two pairs of crosswise links 21, 22 at opposite sides. However, two or more hydraulic cylinders 24 may be provided in parallel depending on the weight of the article 10 to be transported. Further depending on the level to which the lift table 4 is to be raised, the link mechanism may comprise crosswise links 21, 22 in at least two stages as positioned one above the other. Alternatively, other means are usable as the drive means 5.

Although the work space 6 is provided on the upper side of the truck body 2 around the lift table 4, such a work space may be provided on the upper side of the body 2 at at least one side of the lift table 4.

According to the illustrated embodiment, the adjacent truck coupling 31 is disposed at each the front, rear, right and left side edge portions of the truck body 2, whereas the coupling may be provided at at least one side edge portion. Furthermore, both the adjacent trucks 1, 1 to be connected together need not be provided with the hook 32 having the hooked end 32a and the engageable pin 36. The hook 32 may be provided on a side edge portion of one of the trucks 1, 1, with the pin 36 provided on a side edge portion of the other truck 1. The coupling 31 is not limited to the illustrated one but may be one utilizing a magnetic force.

Although not shown, trucks 1, 1 arranged side by side can be connected together exactly in the same manner as above. For example, trucks traveling along the guide rail 3 as oriented longitudinally of the rail can be arranged adjacent to each other sidewise in parallel and connected together with the couplings on the opposed right and left side edge portions of the trucks 1, 1. Additionally, as seen in FIGS. 1 and 2, tracks 1 traveling along the guide rail 3 as oriented longitudinally of the rail are changed in orientation through 90 degrees by the course changing apparatus of the second type with the turntable 20 to arrange the trucks side by side as oriented transversely of the rail 3, and the trucks are then interconnected with couplings 31 on the opposed front and rear side edge portions (right and left side edge portions before the change of orientation) of the trucks.

What is claimed is:

1. An apparatus for changing the course of an electrically driven wheel supported self-propelled truck moving on a floor, said truck having a body and at least one electrically driven wheel attached to a lower side of said body of said truck, said electrically driven wheel being freely rotatable on said lower side of said body in a horizontal plane about a vertical axis and having a flange extending outwardly horizontally therefrom, said flange having downwardly extending, horizontally spaced rail guides, said course changing apparatus comprising at least two truck guide rails mounted on said floor for selective engagement between said rail guides and guiding said electrically driven wheel, said guide rails extending on said floor in a plane parallel to said horizontal plane of rotation of said driven wheel, said rails extending in intersecting directions and a rail segment rotating mechanism on said floor at the intersection of said guide rails and having a rail segment for changing the direction of said drive wheel from the direction of one guide rail of said intersecting guide rails to the direction of the other of said intersecting guide rails, whereby when said drive wheel of said truck traveling along one of said guide rails is stopped on said rail segment rotating mechanism with said rail segment on said rotating mechanism in alignment with said one of said guide rails, said rotating mechanism rotates said drive wheel relative to said intersecting guide rails to align said drive wheel with the other of said guide rails.

2. An apparatus for changing the course of an electrically driven wheel supported self-propelled truck moving on a floor, said truck having a body and at least one electrically driven wheel attached to a lower side of said body of said truck, said electrically driven wheel being freely rotatable on said lower side of said body in a horizontal plane about a vertical axis and having a flange extending outwardly horizontally therefrom, said flange having downwardly extending, horizontally spaced rail guides, said course changing apparatus comprising a first truck guide rail mounted on said floor for engagement between said rail guides and guiding said electrically driven wheel, a truck course changing turntable in a floor portion in axial alignment with said first truck guide rail where said course of said truck is to be changed, a second truck guide rail in axial alignment with and at one of its ends abutting one end of said first guide rail, said second guide rail having its other end at the periphery of said turntable, a third truck guide rail fixed to said turntable for rotation therewith, rail segment rotating mechanisms mounted on said turntable at the opposite ends of said third truck rail and each having a rail segment thereon for rotation therewith for engaging said rail guides on said flange of an electrically driven wheel positioned thereon as said course of said truck on said turntable is being changed by the rotation of said turntable and said rail segment rotating mechanisms, and said rail segments at the opposite ends of said third truck rail and said rail segments thereon are rotated to change the course of said wheel thereon, and a pair of fourth parallel truck rails mounted on said floor for receiving said wheel from said rotated rail segments on said turntable and for engaging said rail guides on said flange for guiding said electrically driven wheel and said truck in said changed course.

3. An apparatus as defined in claim 1 or 2 wherein four freely rotatable truck supporting casters are positioned on the lower side of said truck body along with said electrically driven wheel and on opposite sides of said guide rails, said guide rails having rotary plates with noncontinuous guide rail portions attached thereto for receiving said casters on said rotary plates as said casters are advanced to said rotary plates and contact said noncontinuous guide rail portion thereon for pivoting said rotary plate and said noncontinuous guide rail portion thereon and traversing said received caster through said guide rail, said rotary plate and said noncontinuous guide rail portion thereon being returnable to its original position upon passage of said caster therethrough.

* * * * *